(12) United States Patent
Byun (10) Patent No.: US 9,215,300 B2
(45) Date of Patent: Dec. 15, 2015

(54) DISPLAY MODULE AND MOBILE TERMINAL INCLUDING THE SAME

(71) Applicant: Huiseob Byun, Seoul (KR)

(72) Inventor: Huiseob Byun, Seoul (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 13/656,919

(22) Filed: Oct. 22, 2012

(65) Prior Publication Data

US 2013/0194782 A1 Aug. 1, 2013

(30) Foreign Application Priority Data

Jan. 30, 2012 (KR) ........................ 10-2012-0008792

(51) Int. Cl.
*H04M 1/02* (2006.01)
*H04M 1/22* (2006.01)

(52) U.S. Cl.
CPC .............. *H04M 1/0266* (2013.01); *H04M 1/02* (2013.01); *H04M 1/22* (2013.01)

(58) Field of Classification Search
CPC ..... G09F 13/04; G09F 13/0413; G09F 13/14; G09F 2013/049; G09F 2013/145; G09F 2013/147; H04M 1/02; H04M 1/22; H04M 1/0226

USPC ................ 362/97.1–97.4, 88, 600, 632–634; 349/58

See application file for complete search history.

(56) References Cited

U.S. PATENT DOCUMENTS

| | | | |
|---|---|---|---|
| 7,374,325 B2* | 5/2008 | Ko | ................................. 362/607 |
| 7,379,128 B2* | 5/2008 | Tsubokura et al. | ............. 349/60 |
| 7,701,527 B2* | 4/2010 | Hsu | ................................. 349/58 |
| 2006/0125981 A1* | 6/2006 | Okuda | ......................... 349/110 |
| 2006/0291242 A1* | 12/2006 | Ko | ................................. 362/607 |
| 2009/0147174 A1* | 6/2009 | Ha et al. | .......................... 349/58 |
| 2009/0207327 A1* | 8/2009 | Terao et al. | ....................... 349/5 |
| 2010/0073904 A1* | 3/2010 | Tsai et al. | ..................... 362/97.1 |
| 2010/0079996 A1* | 4/2010 | Shon et al. | .................... 362/246 |
| 2010/0128465 A1* | 5/2010 | Byoun et al. | ................. 362/97.1 |
| 2010/0195017 A1* | 8/2010 | Chuang | ............................ 349/58 |
| 2010/0238373 A1* | 9/2010 | Kang et al. | ...................... 349/58 |
| 2011/0058121 A1* | 3/2011 | Yabe | ............................... 349/62 |

* cited by examiner

*Primary Examiner* — Mary Ellen Bowman
(74) *Attorney, Agent, or Firm* — KED & Associates LLP (57) ABSTRACT

The present invention relates to a display module which is able to prevent light-leakage and to protect a display provided therein against an external shock, and a mobile terminal including the same.

17 Claims, 5 Drawing Sheets

DISPLAY MODULE AND MOBILE TERMINAL INCLUDING THE SAME

CROSS REFERENCE TO RELATED APPLICATION

Pursuant to 35 U.S.C. §119(a), this application claims the benefit of earlier filing date and right of priority to Korean Application No. 10-2012-0008792, filed on Jan. 30, 2012, the contents of which are hereby incorporated by reference herein in their entirety.

BACKGROUND OF THE DISCLOSURE

1. Field of the Disclosure

The present invention relates to a display module which is able to prevent light-leakage and to protect a display provided therein against an external shock, and a mobile terminal including the same.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

Meanwhile, a conventional mobile terminal typically includes a case for defining an exterior appearance thereof, a display for display image information thereon and a mounting frame for fixing the display to the case.

The display may be one of various types and it may include a display panel having a liquid crystal layer and a backlight unit for supplying light to the liquid crystal layer. Positions of the display panel and the backlight unit are fixed by the mounting frame and they are fitted to the case after that.

However, the mobile terminal mentioned above might have a disadvantage of light leakage generated between an outer circumferential surface of the display panel and the mounting frame.

In addition, auxiliary shock absorbing means may be provided between the outer circumferential surface of the display panel and the mounting frame to protect the display panel from an external shock. Accordingly, there might be a disadvantage of the high manufacturing cost and the complex manufacturing process.

Accordingly, the present invention is directed to a display module and a mobile terminal including the same. An object of the present invention is to provide a display module which is able to prevent light-leakage, and a mobile terminal including the same.

Furthermore, another object of the present invention is to provide a display module which is able to protect a display provided therein against an external shock rather than to prevent the light-leakage, and a mobile terminal including the same.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal includes a window; a front case configured to fit the window thereto; a display comprising a display panel arranged between the window and the front case and a backlight unit configured to irradiate lights to the display panel; a mounting frame comprising a backlight receiving portion configured to arrange the backlight unit therein, a panel supporting portion configured to support the display panel, and a light block portion extended from the panel supporting portion to absorb the lights emitted from the backlight unit; and a rear case fitted to the front case.

A recess recessed toward the rear case may be provided in the front case, and the mounting frame may be arranged in the recess.

A perimeter of the display panel may be seated on the panel supporting portion of the mounting frame and the light block portion surrounds a lateral surface of the display panel.

The backlight receiving portion may be provided in a center of the panel supporting portion. The backlight receiving portion may be a hole formed through the panel supporting portion and a backlight unit may be positioned in the hole.

A step may be formed in each of boundaries between the panel supporting portion and the backlight receiving portion and between the panel supporting portion and the light block portion.

The light block portion may have a shape of a ring surrounding an entire lateral surface of the display panel.

The light block portion may surround a corner of the display panel.

The light block portion may be formed of a material having at least predetermined black area.

The light block portion may be formed of an elastic material and the light block portion may be positioned between a lateral surface of the display module and a lateral surface of the recess.

The light block portion may be integrally formed with a panel supporting portion in an insert molding process.

The light block portion may be formed of a low brightness color material and the panel supporting portion may be formed of a high brightness color material.

In another aspect of the present invention, a display module includes a display comprising a display panel and a backlight unit configured to irradiate lights to the display panel; and a mounding frame comprising a backlight receiving portion configured to arrange the backlight unit therein, a panel supporting portion configured to support the display panel, and a light block portion extended from the panel supporting portion to absorb the lights emitted from the backlight unit.

A perimeter of the display panel is seated on the panel supporting portion of the mounting frame and the light block portion may surround a lateral surface of the display panel.

The backlight receiving portion may be provided in a center of the panel supporting portion and the backlight receiving portion may be a hole formed through the panel supporting portion and or a recess formed in the panel.

The light block portion may have a shape of a ring surrounding an entire lateral surface of the display panel.

The light block portion may surround a corner of the display panel.

The light block portion may be formed of a material having at least predetermined black area.

The light block portion may be formed of an elastic material

The light block portion may be integrally formed with a panel supporting portion in an insert molding process.

The light block portion may be formed of a low brightness color material and the panel supporting portion may be formed of a high brightness color material.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DESCRIPTION OF SPECIFIC EMBODIMENTS

In the following detailed description, reference is made to the accompanying drawing figures which form a part hereof, and which show by way of illustration specific embodiments of the invention.

Terminology used in the present specification selects common expressions well known and used currently, and the terminology may be varied by intensions of those who skilled in the air the present invention pertain to, practices or emergence of new technologies. In a specific case, there may be terminology selected by the applicant of the present specification on his or her own discretion and meaning of corresponding terminology will be described in the detailed description. As a result, the terminologies used in the present specification has to be understood based on substantial meaning possessed thereby and contents of the specification, not based on simple titles of the terminologies.

Reference will now be made in detail to the specific embodiments of the present invention, examples of which are illustrated in the accompanying drawings. Wherever possible, the same reference numbers will be used throughout the drawings to refer to the same or like parts.

Figure 1:
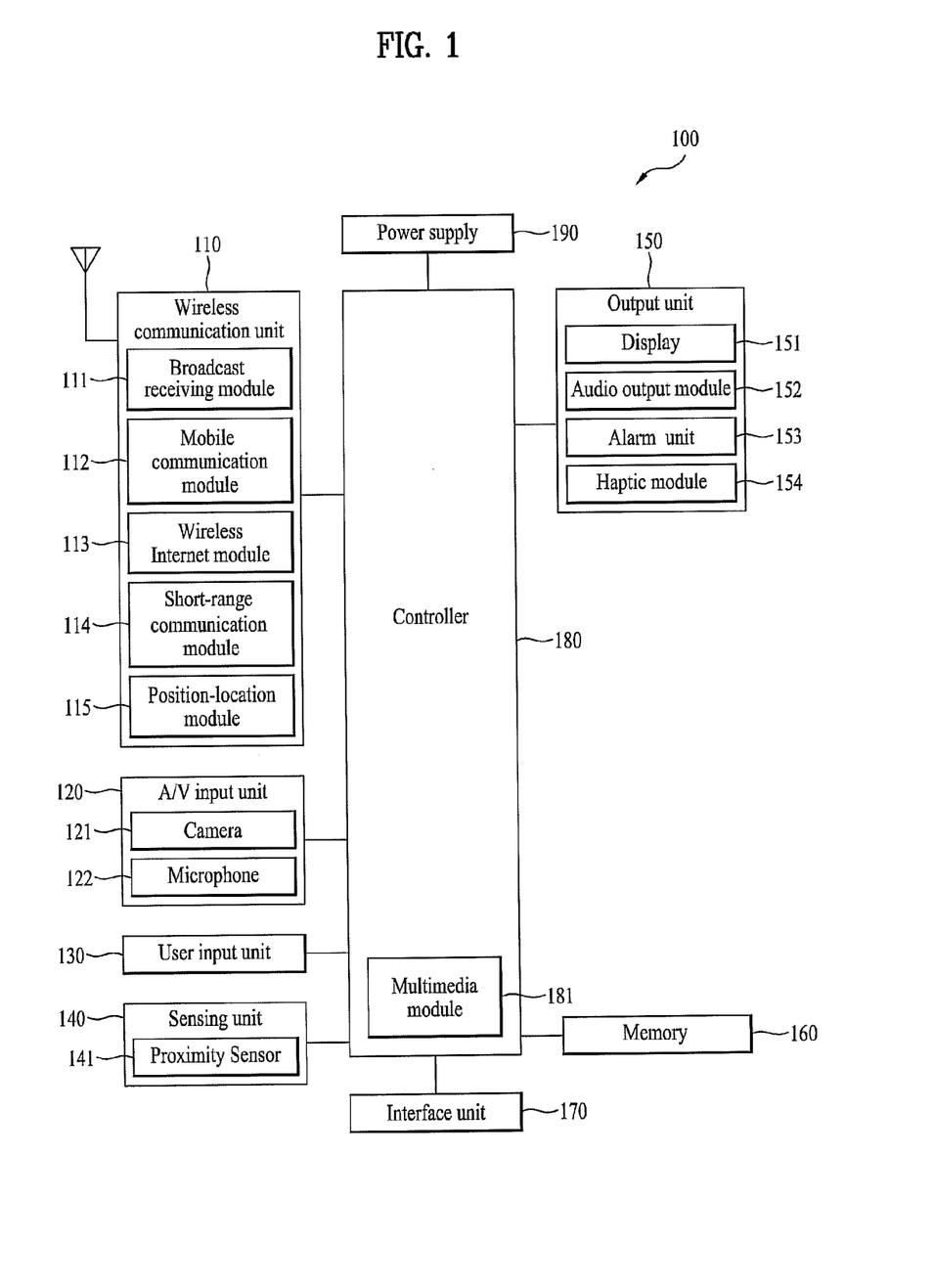
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel. The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

Information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply 190 provides power required by the various components for the mobile terminal 100. The power may be internal power, external power, or combinations thereof.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
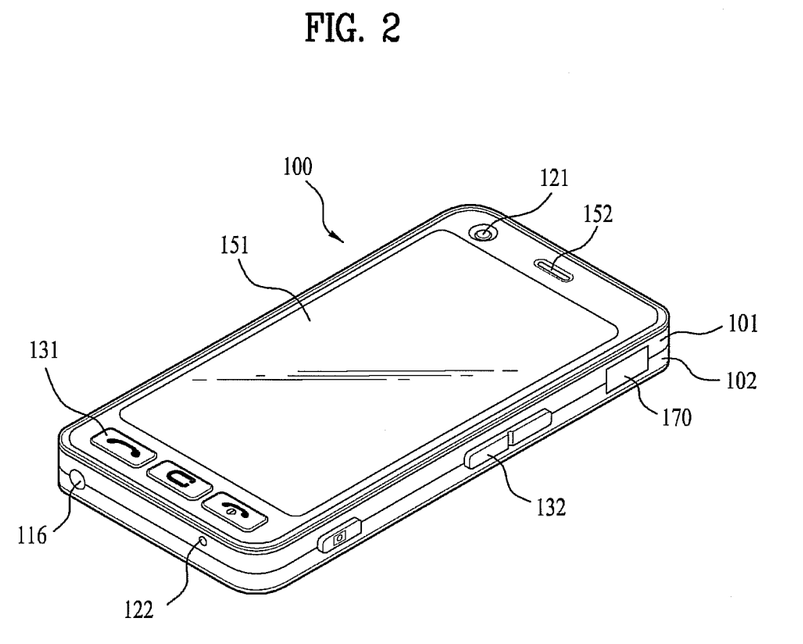
FIG. 2 is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 3:
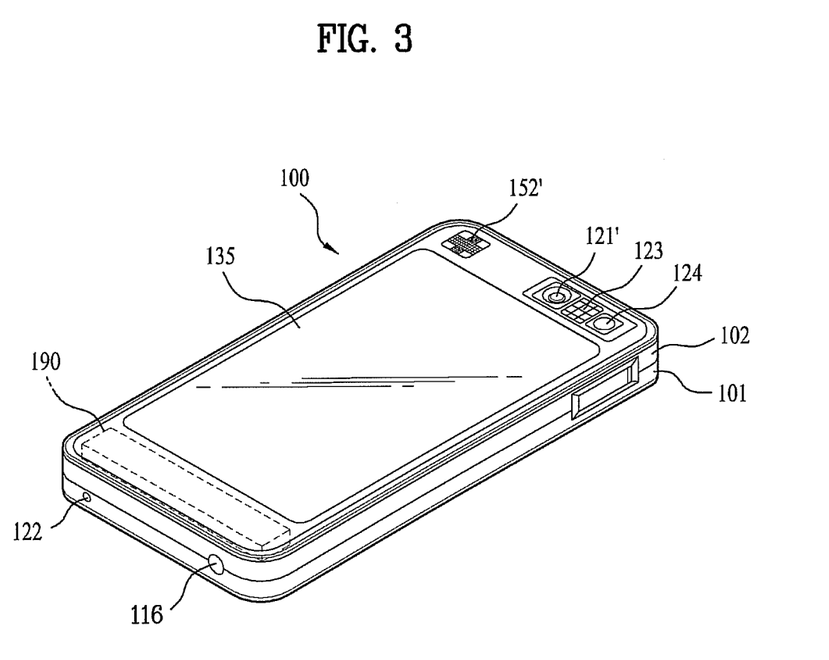
FIG. 3 is a rear perspective diagram of a mobile terminal according to one embodiment of the present invention.

FIG. 3 is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply 190 for supplying a power to the terminal 100 is provided to the terminal body. And, the power supply unit 190 can be configured to be built within the terminal body. Alternatively, the power supply 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

Figure 4:
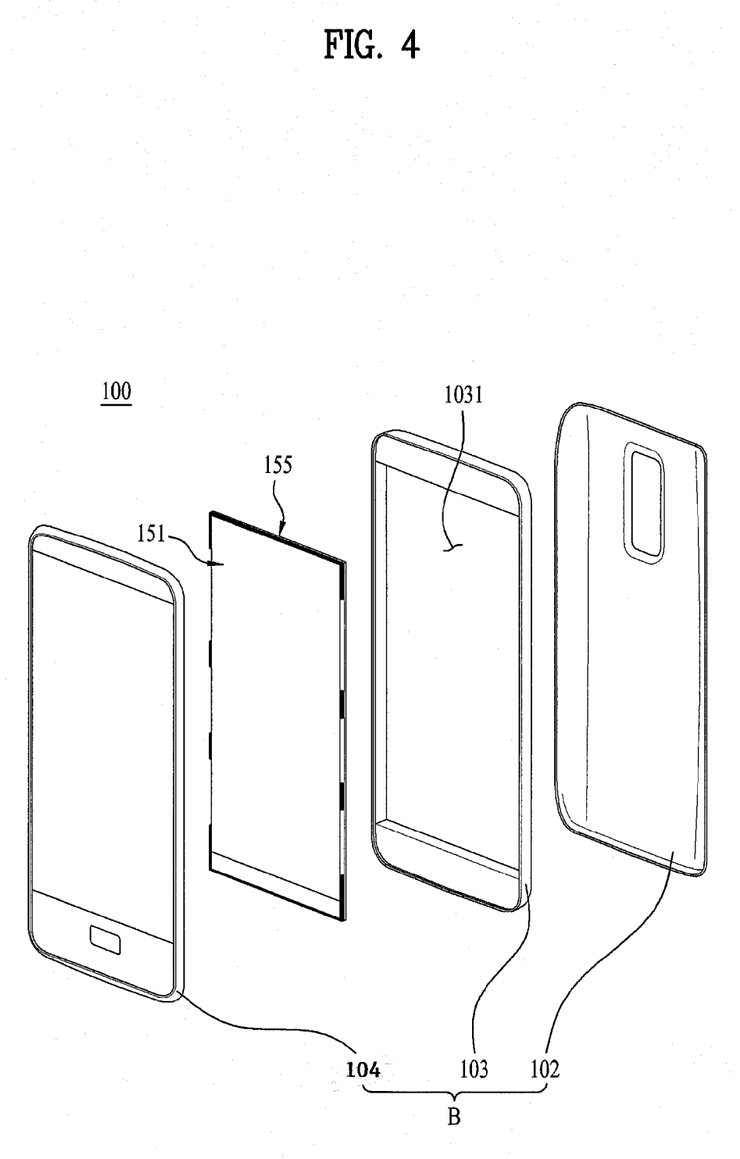
FIG. 4 is an exploded perspective diagram of a mobile terminal according to one embodiment of the present invention.

FIG. 4 is an exploded perspective diagram of a mobile terminal 100 in accordance with one embodiment of the present invention.

The mobile terminal 100 in accordance with the embodiment of the present invention includes a case (B) for defining an exterior appearance thereof and a display module 151 and 155 arranged in the case (B) to display image information thereon.

Figure 5:
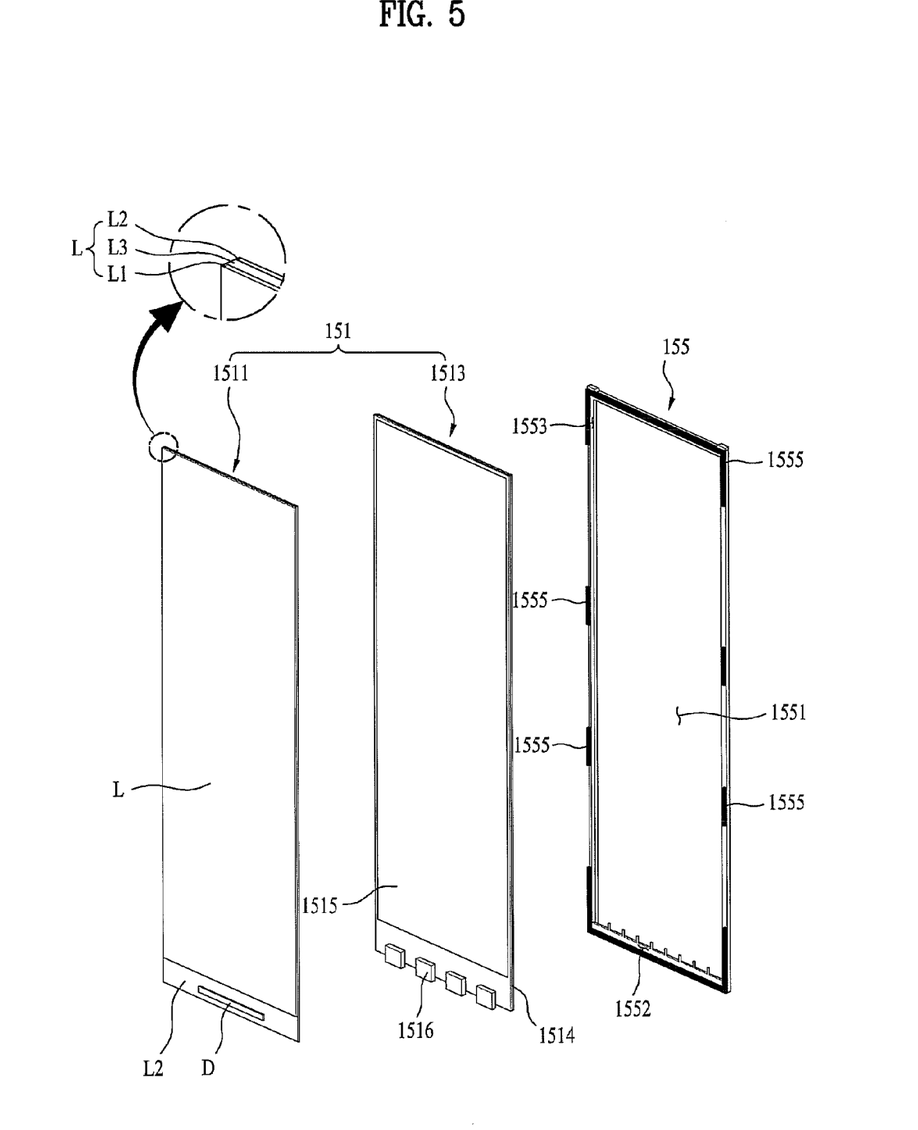
FIG. 5 is an exploded perspective diagram of a display module according to one embodiment of the present invention.
Figure 6:
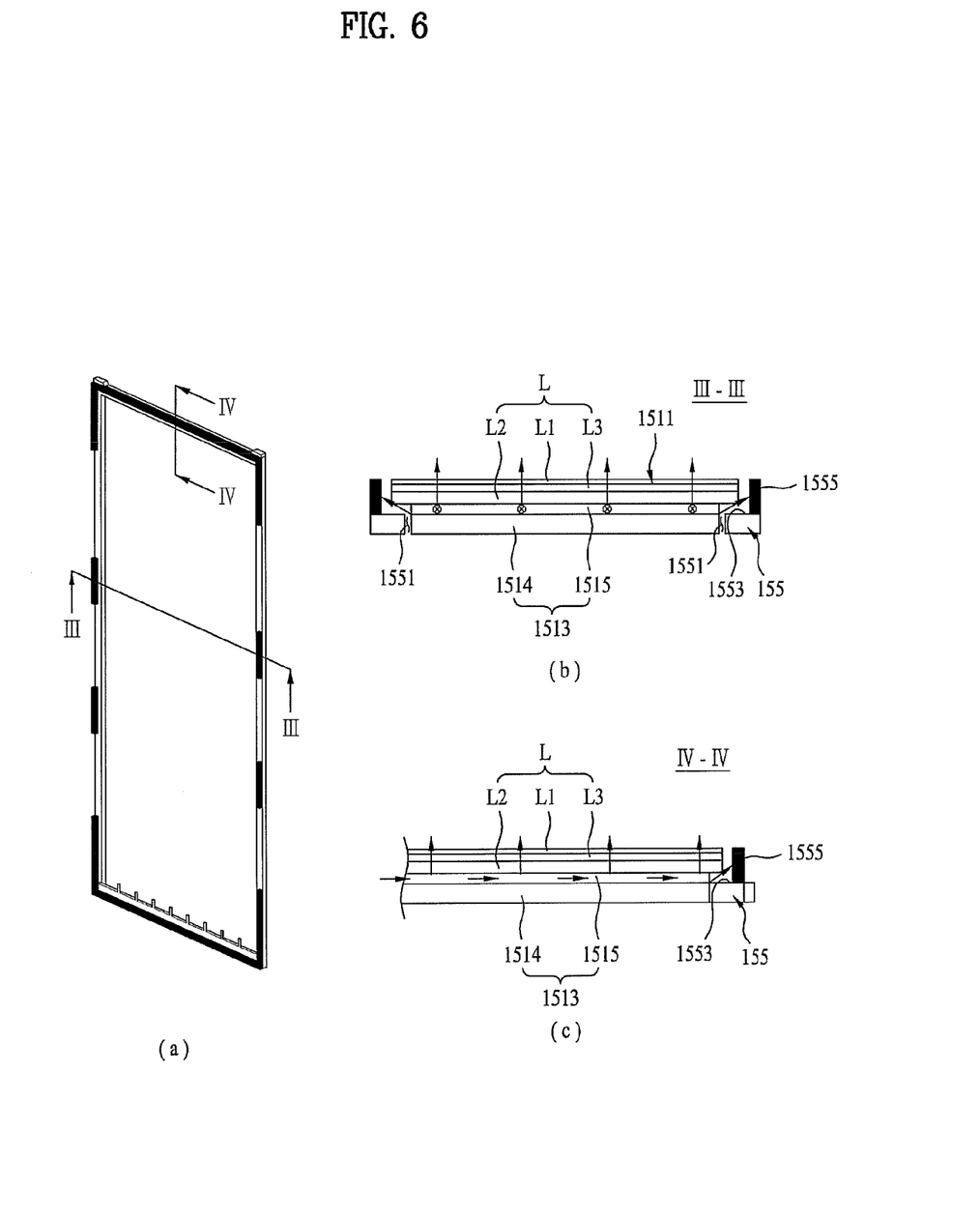
FIG. 6 is a sectional view of the display module according to the embodiment of the present invention.

Referring to FIGS. 4 to 6, specifically, the mobile terminal 100 in accordance with the embodiment of the present invention includes a window 104 and a front case 103 to fit the window 104 thereto, a display 151 having a display panel 1511 arranged between the window 104 and the front case 103 and a display unit 1513 for irradiate lights to the display panel 1511, a mounting frame 155 having a backlight receiving portion 1551 for receiving the backlight unit 1513 therein, a panel supporting portion 1553 for supporting the display panel 1511 and a light block portion 1555 extended from the panel supporting portion 1553 to absorb the light emitted from the backlight unit 1513, and a rear case 102 fitted to the front case 103. The front case 103 may correspond to the front case 101 discussed above.

In this instance, the display 151 and the mounting frame 155 may constitute a display module.

The case (B) includes the front case 103 having the display module arranged thereon, the window 104 fitted to a front portion of the front case 103 to surround the display module, and the rear case 102 fitted to a rear portion of the front case.

The window 104 may include a display region where an image input from the display module is displayed and a bezel region except the display region. The window 104 may include a touch panel capable of sensing touch on at least one of the display and bezel regions. When it including the touch panel, the window 104 may be a touchscreen.

A recess 1031 recessed toward the rear case 102 is provided in a front surface of the front case 103 to accommodate the display module 151 and 155. A battery accommodating part (not shown) is provided in a back surface of the front case 103 to accommodate the power supply (a battery, 190) configured to supply a power to the mobile terminal 100.

In addition, the mounting frame is arranged in the recess 1031. The display panel 1511 and the backlight unit 1513 supported by the mounting frame are located in the recess 1031.

In this instance, the window 104 is fitted to the front surface of the front case 103 and the rear case 102 is detachably fitted to the back surface of the front case 103 to protect the power supply 190.

As shown in FIG. 5, the display module includes the display 151 for displaying image information thereon and the mounting frame 155 for mounting the display 151 to the recess 1041 of the front case 103.

According to an embodiment, the display panel 1511 may be a liquid crystal panel 1511 configured to display information based on transmissivity change in liquid crystal according to a voltage.

The liquid crystal panel 1511 may have a liquid crystal part (L) and a driving part (D). the liquid crystal part (L) includes an upper substrate (L1, a transparent substrate) and a lower substrate (L2, a transparent substrate) that are spaced apart a predetermined distance from each other, an upper electrode (not shown) provided under the upper substrate (L1) and a lower electrode (not shown) positioned on the lower substrate (L2), and a liquid crystal layer (L3) positioned between the upper electrode and the lower electrode.

The display panel 1511 may further include a color filter (not shown) positioned between the upper substrate (L1) and the upper electrode (not shown).

Meanwhile, the driving part (D) controls a voltage between the upper electrode and the lower electrode to control the position of the liquid crystal stored in the liquid crystal layer (L3). The driving part (D) may be a Driver IC provided on the lower substrate (L2).

The backlight unit 1513 is means positioned under the display panel 1511 to supply light toward the liquid crystal layer (L3). The backlight unit 1513 includes a backlight frame 1514, a light guide plate 1515 fixed to the backlight frame 1514, with being positioned under the lower substrate (L2), and a light source 1516 configured to supply light to the light guide plate 1515.

The light guide plate 1515 is means for supplying the light emitted from the light source 1516 to an entire surface of the liquid crystal part (L) uniformly.

In other words, the light guide plate 1515 is employed to receive and uniformly distribute the lights emitted from the light source 1516 to the entire surface of the light guide plate. For example, the light guide plate 1515 may be a transparent acrylic panel.

The light source 1516 may be one of any light source types capable of supplying lights to the light guide plate 1515. FIG. 5 shows LEDs as one example of light sources.

The light source 1516 may be provided in various positions enabling lights to be supplied to the light guide plate 1515. FIG. 5 shows that light sources 1516 are positioned beside the light guide plate 1515, for example.

The mounting frame 155 is means for fitting the display panel 1511 and the backlight unit 1513 to the front case 103 as well as for mounting the display panel 1511 and the backlight unit 1513.

In other words, the mounting frame 155 may be inserted in the recess 1031 of the front case 103. The mounting frame 155 includes a backlight receiving portion 1551 for receiving the backlight frame 1514 therein, a panel supporting portion 1553 for seating the display panel 1511 thereon, and a light block portion 1555 provided in the panel supporting portion 1553 to support an outer circumferential surface of the display panel 1511.

In addition, a perimeter of the display panel is seated on the panel supporting portion 1553 of the mounting frame 155. The light block portion 1555 may surround a side area of the display panel 1511.

The backlight receiving portion 1551 is provided in a center of the panel supporting portion 1513 and it is a hole formed through the panel supporting portion 1513. The backlight unit 1513 may be positioned in the hole. Alternatively, the backlight receiving portion 1511 may be a recess (not shown) provided in the panel supporting portion 1513.

In this instance, a step may be formed in each of boundaries between the panel supporting portion 1513 and the panel supporting portion 1513 and between the panel supporting portion 1513 and the light block portion 1555.

The mounting frame 155 may have various shapes only when it is able to fix the display 151 to the front case 103. FIG. 5 shows that the mounting frame 155 is a rectangular board for example.

In this instance, the backlight receiving portion 1551 may be a rectangular hole or recess formed through the mounting frame 155. The mounting frame 155 may further include a backlight supporting rib 1552 provided in an inner circumferential surface of the backlight receiving portion 1551 to support a lower surface of the backlight frame 1514.

Also, the light block portion 1555 may be formed in a shape of a ring surrounding a front lateral surface of the display panel or a shape of bars surrounding lateral corners of the display panel.

The light block portion 1555 may be formed of a material having a predetermined black area or more. The light block portion 1555 may be formed of material having a low brightness and the panel supporting portion 1553 may be formed of a material having a high brightness.

Specifically, the panel supporting portion 1553 is defined as an area of an upper surface composing the mounting frame 155, without the light block portion therein, and it may have a high brightness color. That is because the lights emitted toward the mounting frame have to be reflected toward the display 151.

In this instance, the light block portion 1555 may have a predetermined brightness that is lower than the brightness of the panel supporting portion 1553.

Also, light block portion 1555 may be painted a low brightness color or in a low brightness material such as a black material. That is because some of the lights emitted from the backlight unit have to be prevented from leaking between an outer circumferential surface of the display panel 1511 and the light block portion 1555.

If described more specifically, referring to FIG. 6, most of the lights emitted from the light source 1516 are supplied to the liquid crystal part (L) via the light guide plate 1515. Some of the lights supplied to the liquid crystal part (L) from the light guide plate 151 might leak between the outer circumferential surface of the liquid crystal part (L) and the light block portion 1555 (namely, light-leakage).

In other words, as shown in FIGS. 6 (*b*) and 6 (*c*), most of the lights supplied to the light guide plate 1515 are supplied toward the display panel 1511. However, a predetermined amount of the lights are supplied to a space formed between the outer circumferential surface of the display panel 1511 and the light block portion 1555.

If the light block portion 1555 reflects the lights after failing to absorb the leaking lights, the light-leakage might be generated and the lights might leak along the space formed between the outer circumferential surface of the display panel and the light block portion 1555.

Accordingly, the light block portion 1555 is painted a color capable of absorbing lights or painted in a material capable of absorbing lights in the display unit in accordance with the present invention and the mobile terminal including the display unit, such that the light-leakage mentioned above may be prevented.

Meanwhile, if it is difficult to realize the light block portion 1555 having the lowest brightness, namely, black, the light block portion 1555 may be formed of a material having a predetermined brightness that is lower than the brightness of the panel supporting portion 1553.

In addition, the light block portion 1555 may be formed of an elastic material and it may be positioned between a lateral surface of the display panel 1511 and a lateral surface of the recess 1031.

Specifically, the light block portion 1555 may be an elastic body elastically supporting the outer circumferential surface of the display panel 1511, to protect the display 151 against an external shock, without auxiliary shock-absorbing means.

In the conventional display module, auxiliary shock-absorbing means may be provided between the mounting frame 155 and an inner circumferential surface of the recess 1031, to protect the display 151 against an external shock.

However, in the display module according to the present invention, the light block portion 1555 is formed of the elastic body and the auxiliary shock-absorbing means for protect the display 151 do not have to be provided between the outer circumferential surface of the mounting frame 155 and the inner circumferential surface of the recess 1031 provided in the front case 103.

Meanwhile, the light block portion 1555 may be integrally formed with the panel supporting portion 1553, to enhance durability of the display module and to ease the assembly process for the display module (the display 151) and the mounting frame 155.

In this instance, 1555 may be integrally formed with the panel supporting portion 1553 as one body in an insert molding process.

As described above, the display module according to the embodiment of the present invention and the mobile terminal including the display module can prevent the light-leakage and protect the display from the external shock.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a window;
a front case to receive the window thereto;
a display that includes a display panel at a backside of the window, and a backlight unit to irradiate light to the display panel, and the display panel has a perimeter portion extended outward from an edge of the backlight unit;
a mounting frame that includes a backlight receiving portion, a panel supporting portion and a light block portion; and
a rear case to attach to the front case,
wherein the backlight receiving portion receives the backlight unit therein, the panel supporting portion supports a back side of the perimeter portion of the display panel, and the light block portion extends from the panel supporting portion such that the light block portion is adjacent a side surface of the display panel and absorbs the light from the backlight unit, wherein the light block portion is formed of an elastic material.

2. The mobile terminal according to claim 1, wherein the backlight receiving portion includes a hole formed through the panel supporting portion, and the backlight unit is provided in the hole of the backlight receiving portion.

3. The mobile terminal according to claim 1, wherein a step is provided in a boundary between the panel supporting portion and the backlight receiving portion, and a step is provided in a boundary between the panel supporting portion and the light block portion.

4. The mobile terminal according to claim 1, wherein the light block portion is adjacent an entire side surface of the display panel.

5. The mobile terminal according to claim 1, wherein the light block portion is adjacent a corner of the display panel.

6. The mobile terminal according to claim 1, wherein the front case includes a recess that is recessed toward the rear case, and
the mounting frame is provided in the recess.

7. The mobile terminal according to claim 1, wherein the light block portion is formed of a material having a black area.

8. The mobile terminal according to claim 1, wherein the light block portion is formed of a low brightness color material, and the panel supporting portion is formed of a high brightness color material.

9. A display module comprising:
a display that includes a display panel and a backlight unit to provide light to the display panel, the display panel has a perimeter portion extended outward from an edge of the backlight unit; and
a mounting frame to support the display panel and the backlight unit, the mounting frame including a backlight receiving portion to receive the backlight unit, a panel supporting portion to support a back side of the perimeter portion of the display panel, and a light block portion to extend from a surface of the panel supporting portion and to absorb the light from the backlight unit, and the light block portion is provided adjacent a side surface of the display panel,
wherein the light block portion is formed of an elastic material.

10. The display module according to claim 9, wherein the backlight receiving portion includes a hole formed through the panel supporting portion or a recess formed in the panel supporting portion.

11. The display module according to claim 9, wherein the light block portion is provided adjacent an entire side of the display panel.

12. The display module according to claim 9, wherein the light block portion is adjacent a corner of the display panel.

13. The display module according to claim 9, wherein the light block portion is formed of a black material.

14. A display apparatus comprising:
a display panel to display an image;
a backlight unit to provide light to the display panel; and
a mounting frame that includes a panel supporting portion and a light block portion, wherein the display panel has a perimeter portion extended outward from an edge of the backlight unit, and
wherein the panel supporting portion supports a back side of the perimeter portion of the display panel such that the panel supporting portion is adjacent at least a side portion of the backlight unit, and the light block portion is adjacent at least a side portion of the display panel, and the light block portion to extend substantially perpendicular from a front surface of the panel supporting portion, and the light block portion formed of a material to absorb or reflect the light from the backlight unit, wherein the light block portion is formed of a low brightness color material, and the panel supporting portion is formed of a high brightness color material.

15. The display apparatus according to claim 14, wherein the light block portion is formed of an elastic material.

16. The display apparatus according to claim 14, wherein the light block portion is provided adjacent an entire side of the display panel.

17. A mobile terminal comprising:
a front case;
a rear case to attach to the front case; and
the display apparatus of claim 14.

* * * * *